United States Patent
Chowdhury et al.

(10) Patent No.: US 11,705,766 B2
(45) Date of Patent: Jul. 18, 2023

(54) ELECTRIC MOTOR HAVING PERMANENT MAGNET ROTOR AND STATOR

(71) Applicant: HL MANDO CORPORATION, Gyeonggi-do (KR)

(72) Inventors: Mazharul Chowdhury, Midland, MI (US); Md Sariful Islam, Bay City, MI (US); Mohammad Islam, Bay City, MI (US); Abraham Tesfamicael, Bay City, MI (US)

(73) Assignee: HL MANDO CORPORATION, Gyeonggi-Do (KR)

( * ) Notice: Subject to any disclaimer, the term of this patent is extended or adjusted under 35 U.S.C. 154(b) by 126 days.

(21) Appl. No.: 17/024,652

(22) Filed: Sep. 17, 2020

(65) Prior Publication Data
US 2022/0085671 A1    Mar. 17, 2022

(51) Int. Cl.
*H02K 1/27* (2022.01)
*H02K 1/16* (2006.01)
*H02K 1/276* (2022.01)

(52) U.S. Cl.
CPC ............ *H02K 1/276* (2013.01); *H02K 1/165* (2013.01)

(58) Field of Classification Search
CPC ....... H02K 1/165; H02K 1/276; H02K 1/2766
USPC .................................................... 310/156.01
See application file for complete search history.

(56) References Cited

U.S. PATENT DOCUMENTS

| | | | | |
|---|---|---|---|---|
| 8,102,091 B2* | 1/2012 | Ionel | ...................... | H02K 1/2766 310/156.53 |
| 8,174,158 B2* | 5/2012 | Rahman | ............... | H02K 1/2766 310/156.56 |
| 9,184,648 B2* | 11/2015 | Taniguchi | .............. | H02K 29/03 |
| 9,893,579 B2* | 2/2018 | Cao | ......................... | H02K 1/146 |
| 10,186,918 B2* | 1/2019 | Kim | ...................... | H02K 1/2773 |
| 10,205,358 B2* | 2/2019 | Hao | ....................... | H02K 1/2766 |
| 10,218,234 B2* | 2/2019 | Sun | ......................... | H02K 1/08 |
| 10,284,036 B2* | 5/2019 | Hao | ........................ | H02K 21/14 |
| 10,411,535 B2* | 9/2019 | Takahashi | .............. | H02K 1/276 |

FOREIGN PATENT DOCUMENTS

| JP | 2014087229 A | * | 5/2014 |
|---|---|---|---|
| JP | 6079132 | | 2/2017 |

* cited by examiner

*Primary Examiner* — Alex W Mok
(74) *Attorney, Agent, or Firm* — Ladas & Parry, LLP

(57) ABSTRACT

A permanent magnet motor comprises: a stator comprising teeth; and a rotor rotatable relative to the stator, the rotor having a plurality of poles, wherein each pole of the rotor comprises a pair of magnet retention slots, each magnet retention slot accommodating a magnet. Surfaces of the teeth of the stator facing the rotor are flat or have an arc shape. Each magnet retention slot may have a plurality of angled slot surfaces forming a first barrier around a corner of the magnet positioned closest to an outer surface of the rotor. At least three second barriers are positioned around a mid-axis extending along between the pair of the magnet retention slots. Each magnet retention slot comprises a slot surface slanted or curved relative to a second side surface of the magnet facing an inner surface of the rotor to form a third barrier around an end of the second side surface of the magnet.

19 Claims, 8 Drawing Sheets

ELECTRIC MOTOR HAVING PERMANENT MAGNET ROTOR AND STATOR

BACKGROUND

Various embodiments of the present disclosure relate in general to an electric motor, and more particularly, to a structure and components of rotor and stator assemblies of a permanent magnet motor to improve motor performance, reduce torque ripple and lower stress to the rotor assembly.

A motor is a well-known electrical machine that converts electrical energy into mechanical energy using magnetic field linkage. Permanent magnet electric motors are known for their high efficiency. The permanent magnet motors are also known for their durability, controllability, and absence of electrical sparking. Due to their advantages the permanent magnet motors are widely used in automobile applications.

However, one of the well-known problems of the permanent magnet motor is torque ripple. Sources of torque ripple in the permanent magnet motors include inherent harmonics in the flux linkage, and cogging. Cogging may be a term used to describe the torque of the permanent magnet motor disconnected from the power source. Presence of harmonics in the flux linkage results in instantaneous torque that pulsates as a function of the rotor position. Torque ripple may be generally undesirable in many permanent magnet motors applications, particularly at low speed.

It is with respect to these and other general considerations that the following embodiments have been described. Also, although relatively specific problems have been discussed, it should be understood that the embodiments should not be limited to solving the specific problems identified in the background.

SUMMARY

The features and advantages of the present disclosure will be more readily understood and apparent from the following detailed description, which should be read in conjunction with the accompanying drawings, and from the claims which are appended to the end of the detailed description.

According to various embodiments of the present disclosure, a permanent magnet motor may comprise: a stator assembly comprising teeth associated with arrangement of conductors; and a rotor assembly configured to be rotatable relative to the stator assembly, the rotor assembly having a plurality of poles, wherein each pole of the rotor assembly may comprise a pair of magnet retention slots, each magnet retention slot accommodating a magnet.

According to some exemplary embodiments of the present disclosure, surfaces of the teeth of the stator assembly facing the rotor assembly may be flat or have an arc shape.

According to certain exemplary embodiments of the present disclosure, each magnet retention slot may have a plurality of angled or curved slot surfaces forming a first barrier around a corner of the magnet positioned closest to an outer surface of the rotor assembly. The plurality of angled or curved slot surfaces forming the first barrier around the corner of the magnet positioned closest to the outer surface of the rotor assembly (e.g. a corner-rip of the rotor assembly) may be configured to reduce torque ripple of the permanent magnet motor and stress to the rotor assembly. For example, the plurality of angled or curved slot surfaces forming the first barrier around the corner of the magnet positioned closest to the outer surface of the rotor assembly comprise: a first angled or curved slot surface slanted relative to a first side surface of the magnet facing the outer surface of the rotor assembly; a second angled or curved slot surface extending from the first angled or curved slot surface gradually decreasing a distance between the outer surface of the rotor assembly and the second angled or curved slot surface; a third angled or curved slot surface extending from the second angled or curved slot surface and gradually increasing a distance between the outer surface of the rotor assembly and the third angled or curved slot surface; and a fourth angled or curved slot surface extending from the third angled or curved slot surface toward one end of the magnet. The first barrier of one of the pair of the magnet retention slots formed around the corner of the magnet positioned closest to the outer surface of the rotor assembly may be asymmetric to the first barrier of another of the pair of the magnet retention slots formed around the corner of the magnet positioned closest to the outer surface of the rotor assembly with respect to the mid-axis. Alternatively, the first barriers of the pair of the magnet retention slots may be symmetric to each other with respect to the mid-axis.

According to some exemplary embodiments of the present disclosure, at least three second barriers may be positioned around a mid-axis extending along between the pair of the magnet retention slots. At least three second barriers positioned around the mid-axis extending along between the pair of the magnet retention slots may be configured to provide reduction in torque ripple of the permanent magnet motor. The mid-axis extending along between the pair of the magnet retention slots may be a direct current axis (d-axis) of each pole of the rotor assembly. At least three second barriers positioned around the mid-axis extending along between the pair of the magnet retention slots may comprise: outer barriers; and a middle barrier positioned between the outer barriers. The middle barrier may be positioned at the mid-axis extending along between the pair of the magnet retention slots. The middle barrier may be larger than the outer barriers. The outer barriers may be positioned asymmetrically with respect to the middle barrier or the mid-axis extending along between the pair of the magnet retention slots. The outer second barriers may have different sizes and/or shapes from each other.

According to certain exemplary embodiments of the present disclosure, each magnet retention slot may comprise one or more slot surfaces slanted or angled relative to a second side surface of the magnet facing an inner surface of the rotor assembly to form one or more third barriers around one or both ends of the second side surface of the magnet. The third barriers formed around the one or both ends of the second side surface of the magnet facing the inner surface of the rotor assembly may be configured to decrease torque ripple of the permanent magnet motor and lower stress to the rotor assembly. For example, one or more third barriers formed around the one or both ends of the second side surface of the magnet facing the inner surface of the rotor assembly have a triangular shape. The third barriers of one of the pair of the magnet retention slots formed around the one or both ends of the second side surface of the magnet may be asymmetric to third barriers of another of the pair of the magnet retention slots formed around the one or both ends of the second side surface of the magnet with respect to the mid-axis. Alternatively, the third barriers of the pair of the magnet retention slots may be symmetric to each other with respect to the mid-axis.

According to some exemplary embodiments of the present disclosure, the pair of magnet retention slots have shapes, sizes and/or positions asymmetric to each other with respect to the mid-axis.

This Summary is provided to introduce a selection of concepts in a simplified form that are further described below in the Detailed Description. This summary is not intended to identify key features or essential features of the claimed subject matter, nor is it intended to be used to limit the scope of the claimed subject matter.

BRIEF DESCRIPTION OF THE DRAWINGS

Various embodiments in accordance with the present disclosure will be described with reference to the drawings, in which.

Corresponding numerals and symbols in the different figures generally refer to corresponding parts unless otherwise indicated. The figures are drawn to clearly illustrate the relevant aspects of the embodiments and are not necessarily drawn to scale.

DETAILED DESCRIPTION OF EMBODIMENTS

In the following detailed description, reference is made to the accompanying drawings which form a part of the present disclosure, and in which are shown by way of illustration specific embodiments in which the invention may be practiced. These embodiments are described in sufficient detail to enable those skilled in the art to practice the invention, and it is to be understood that other embodiments may be utilized and that structural, logical and electrical changes may be made without departing from the spirit and scope of the invention. The following detailed description is therefore not to be taken in a limiting sense, and the scope of the invention is defined only by the appended claims and equivalents thereof. Like numbers in the figures refer to like components, which should be apparent from the context of use.

Figure 1:
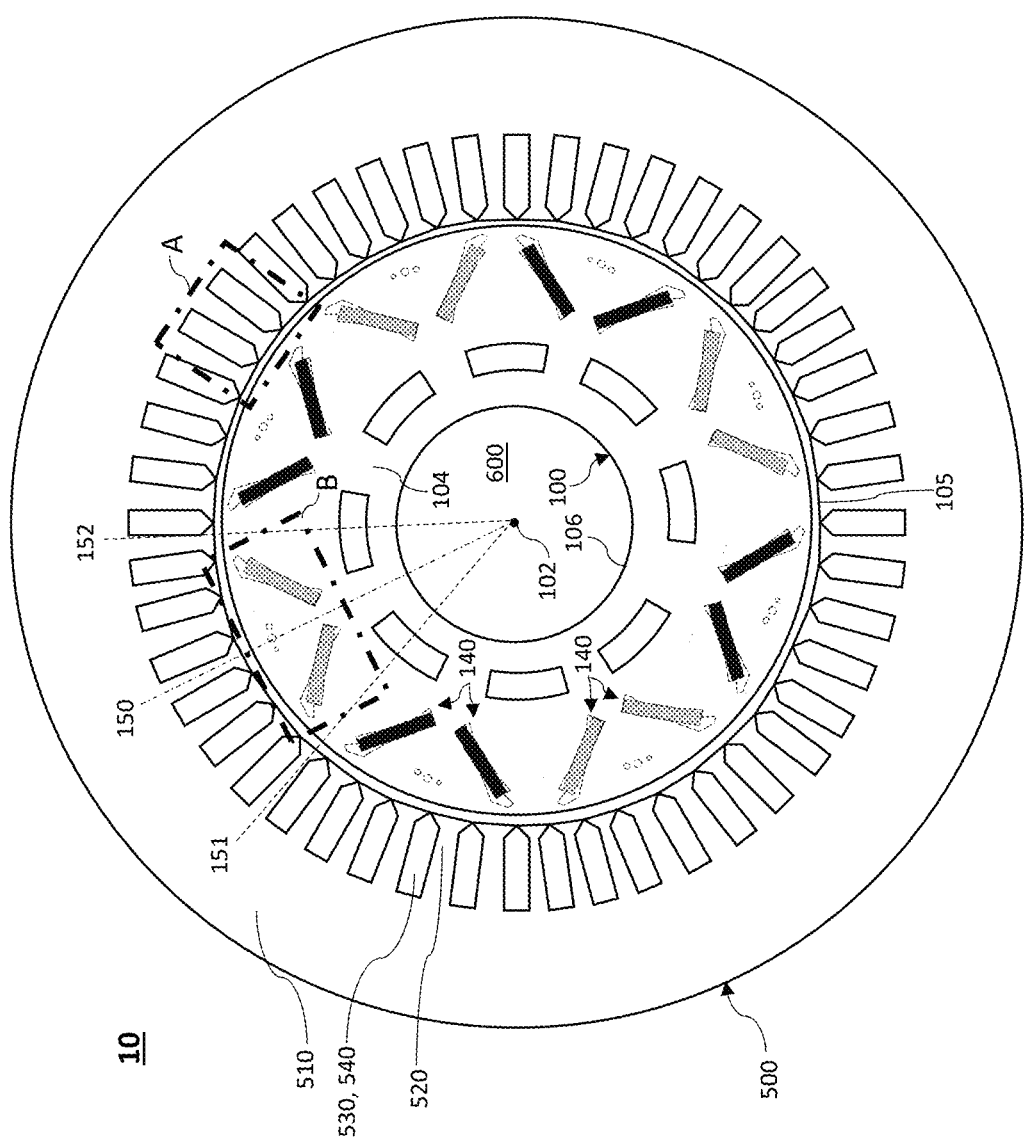
FIG. 1 is a horizontal cross-sectional view of a permanent magnet motor according to an exemplary embodiment of the present disclosure.
Figure 2:
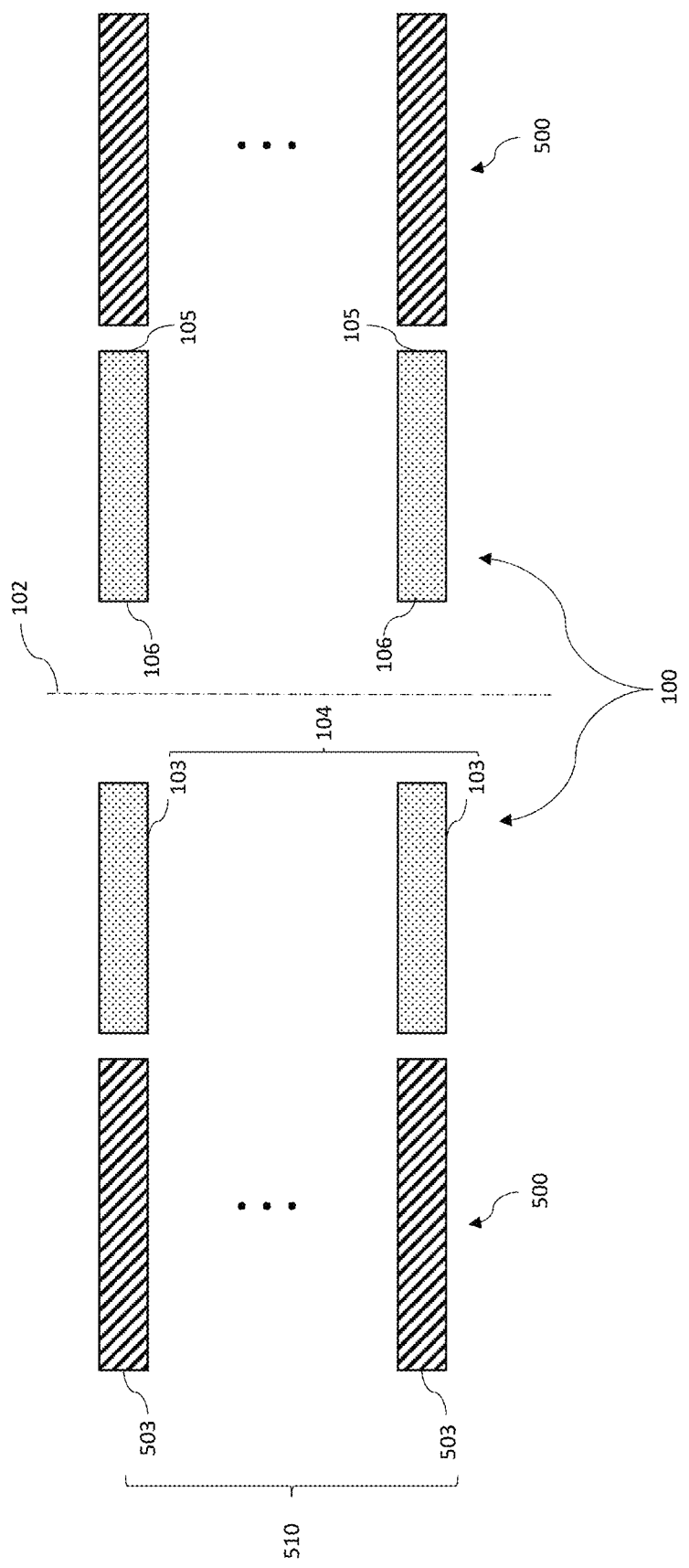
FIG. 2 is a vertical cross-sectional view of a permanent magnet motor according to an exemplary embodiment of the present disclosure.

FIGS. 1 and 2 illustrate cross-sectional views of a permanent magnet motor according to an embodiment of the present disclosure.

A permanent magnet motor 10 includes a rotor assembly 100, a stator assembly 500, and a rotor shaft 600. The rotor assembly 100 is disposed for rotation within, and relatively to, the stator assembly 500. The rotor assembly 100 may be rotatably seated on or fixed to the rotor shaft 600. Alternatively, the rotor assembly 100 may be disposed outside the stator assembly 500 to define an exterior rotor motor. The rotor assembly 100 and the stator assembly 500 each may be disposed about and extend along a central axis 102. The rotor assembly 100 may be disposed concentric with the stator assembly 500.

The stator assembly 500 includes a stator core 510. The stator core 510 may be generally cylindrical in shape and extends along the central axis 102. The stator core 510 may include a substantially circular outer surface. An inner surface of the stator core 510 may be formed by a plurality of stator teeth 520. The stator teeth 520 may be arranged circumferentially and may protrude toward the rotor assembly 100. The inner surface of the stator core 510 may form a cavity within the stator assembly 500 that is configured to receive the rotor assembly 500.

Figure 3:
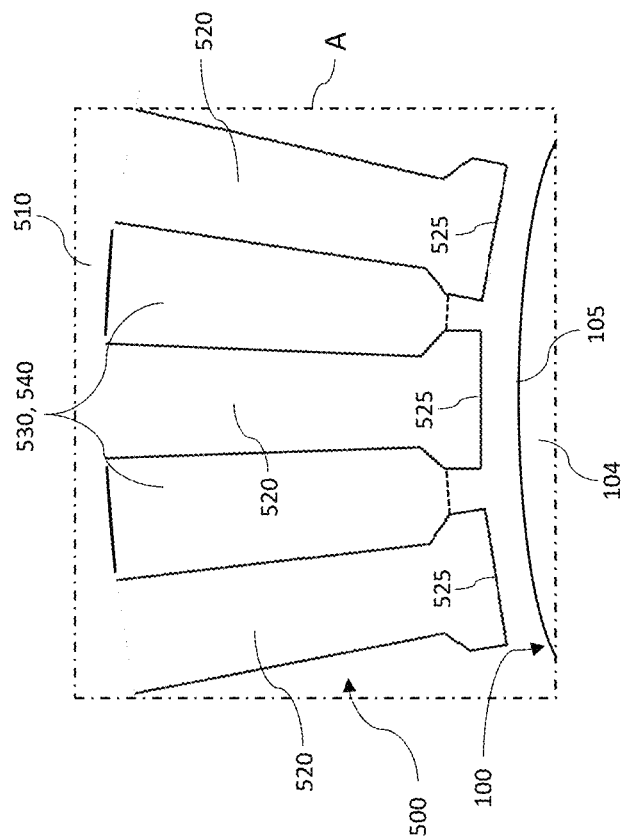
FIG. 3 is a partial enlarged view of a stator assembly taken from a portion A in FIG. 1.

As shown in an exemplary embodiment of FIG. 3, each of the stator teeth 520 may have a flat surface 525 facing the rotor assembly 100. The flat surfaces 520 of the stator teeth 520 may be positioned proximate to the rotor assembly 100 and be disposed at the distal end of the stator teeth 520. The flat surface 525 of the stator tooth 520 may be substantially perpendicular to an axis extending from the central axis 102 toward an outer surface 105 of the rotor assembly 100. Alternatively, the flat surface 525 of the stator tooth 520 may be substantially perpendicular to a direction that the stator tooth 520 protrudes toward the rotor assembly 100. The embodiments that the stator teeth 520 have the flat surface 525 facing the rotor assembly 100 instead of an arc or curved surface may improve necessary ripple and cogging performance. For example, a reduction in torque ripples and cogging torque may be achieved by the flat surface 525 of the stator teeth 520. Alternatively, the surface 525 of the stator teeth 520 may have an arc shape.

Stator slots 530 may be defined by the adjacent pair of stator teeth 520 that form the respective slot. The stator slots 530 may be formed in the stator core 510 of the stator assembly 500. The stator slots 530 may be designed and dimensioned to receive conductors 540. The conductors 540 may be placed in the stator slots 530 to form electromagnetic windings. For example, the conductors 540 may extend in the axial direction through the stator slots 530 or be disposed about (e.g., wound or slid about) the teeth 520 of the stator core 510. The stator slots 530 may have partially open slots such that small openings to the stator slots 520 are provided along the inner surface of the stator core 510.

The stator assembly 500 may be comprised of the stator core 510 (e.g. iron core) made of a stack of stator laminations 503 of FIG. 2 and a winding arrangement for the conductors 540 that carry an excitation current. Current flowing through the conductors 540 generates a stator electromagnetic flux. The stator flux may be controlled by adjusting the magnitude and frequency of the current flowing through the conductors 540.

The rotor assembly 100 may include a rotor core 104 that is disposed on the rotor shaft 600. The rotor core 104 may radially extend (relative to the central axis 102) between an inner rotor surface 106 and an outer rotor surface 105. The inner rotor surface 106 may be fixed to the rotor shaft 600 and may be disposed closer to the central axis 102 than the outer rotor surface 105. The outer rotor surface 105 may be spaced apart from the inner stator surface of the stator 500 by, for example, an air gap therebetween.

As shown in FIG. 2, the rotor assembly 100 and the stator assembly 500 may be implemented as multiple rotor laminations 103 forming the rotor core 104 and multiple stator laminations 503 forming the stator core 510. The multiple rotor laminations 103 and the multiple stator laminations 503 are arranged in an axially stacked relationship. For example, the multiple rotor laminations 103 and the multiple stator laminations 503 are stacked along the central axis 102. Any number of laminations in a given design may be used, depending on design choice.

The rotor assembly 100 is configured to be rotatable about the central axis 102. The rotor assembly 100 defines a plurality of magnet retention slots 110 (e.g. holes or cavities) distributed within the rotor assembly 100 along a radially outboard surface of the rotor assembly 100. The magnet retention slots 110 may have various configurations such as, for example, but not limited to, a V-type, a spoke-type, a bar-type, an I-type, or any appropriate type. One or more permanent magnets 120 may be disposed in each of the magnet retention slots 110. The permanent magnet 120 may be high temperature magnet having higher coercivity, higher grade or higher operable temperature, for example, but not limited to, samarium cobalt (Sm—Co) magnet or neodymium iron boron (Nd—Fe—B) magnet, high energy density permanent magnet, or rare earth permanent magnet. However, the permanent magnet 120 can be any type of magnet which is appropriate for operation of the motor 10. The permanent magnet 120 may be a rectangular bar type to optimize the usage of the high temperature magnet and reduce the cost, although the permanent magnet 120 can have any shape for a necessary operation of the motor 10.

The rotor assembly 100 may comprise the rotor core 104 made of a stack of the rotor laminations 103 and the permanent magnets 120 inserted within the magnet retention slots 110 that are defined by the rotor core 104. The rotor core 104 may be made of, for example, but not limited to, silicon steel, nickel iron, amorphous iron, and the like. The permanent magnets 120 in the rotor assembly 100 may generate a rotor electromagnetic flux. The rotor flux may include harmonic fluxes due to shapes and sizes of the discrete permanent magnets. The stator flux and the rotor flux may be distributed in the air-gap between the rotor assembly 100 and the stator assembly 500. Interaction between the stator flux and the rotor flux causes the rotor assembly 100 to rotate relative to the stator assembly 500.

The rotor assembly 100 has a number of poles 140. Each pole 140 may include one or more magnet retention slots 110. One or more magnets 120 may be disposed in each magnet retention slot 110. Each group of the magnets 120 disposed in the magnet retention slots 110 may form a single magnet pole 140. The group of the magnets 120 is arranged to cooperatively form a magnetic pole 140. For example, two magnets 120 disposed in the pair of the magnet retention slots 110 may form a single magnet pole 140. However, three or more magnets 120 may form a single magnet pole 140, and/or each pole 140 may have one or three or more magnet retention slots 110.

A plurality (e.g., sixteen) of the magnet retention slots 110 are distributed along the radially outboard surface of the rotor assembly 100. Each of the magnet retention slots 110 is substantially rectangular in cross-sectional shape. The magnet retention slots 110 may be slightly oversized around opposite ends to limit magnetic flus leakage between north and south poles of the individual permanent magnets. For example, each of the magnet retention slots 110 may include first and/or third barriers 210 and/or 230 which will be described in detail below. These barriers may impede magnetic flux because vacuum or non-magnetic material has relatively low magnetic permeability compared to the material of the rotor core 104. Each of the magnet retention slots 110 is configured to facilitate insertion of the permanent magnet 120 into each of the magnet retention slots 110 while also providing acceptable retention and reliable positioning of the permanent magnet 120 within each of the magnet retention slots 110.

Figure 4A:
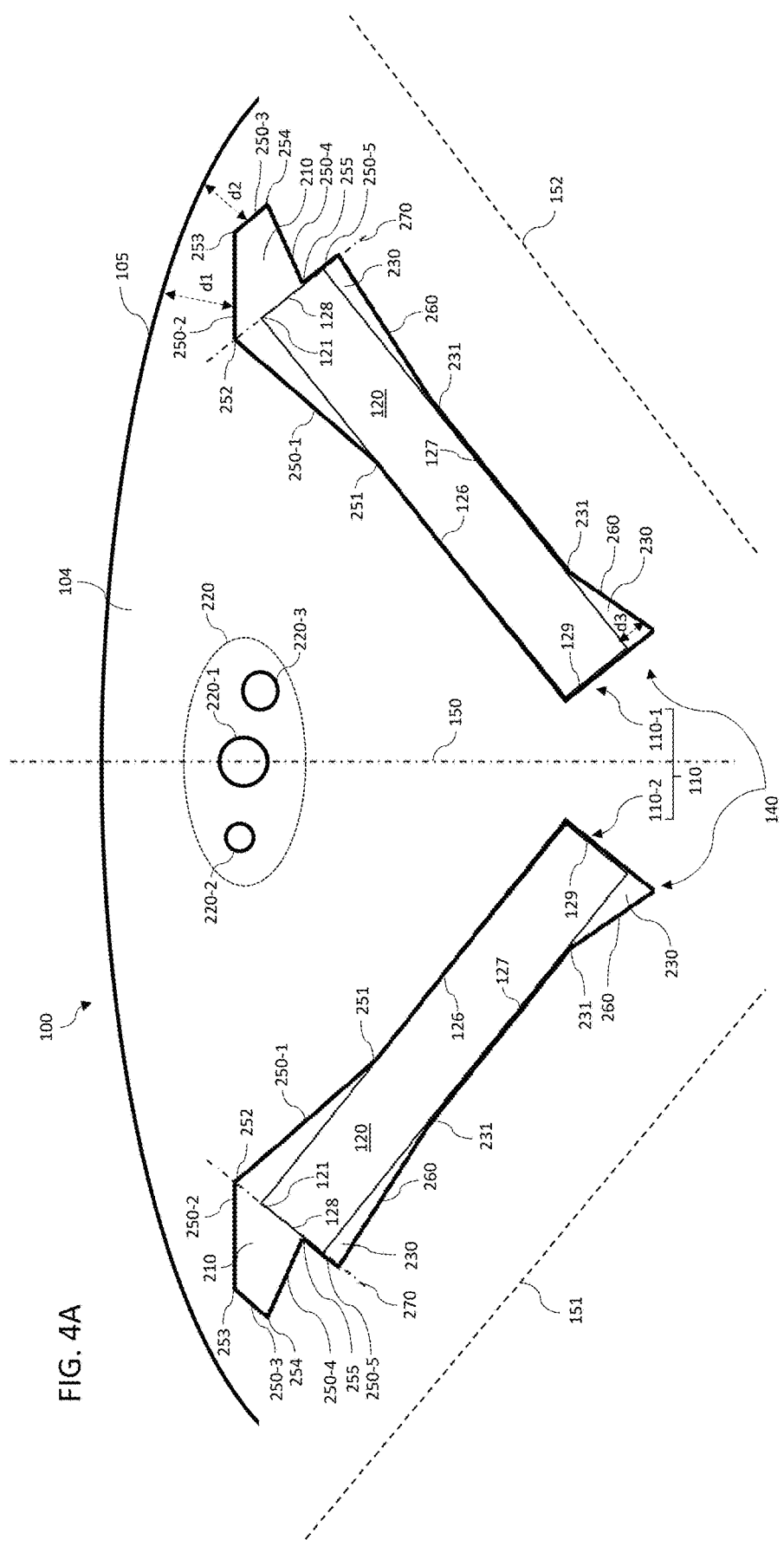
FIGS. 4A and 4B are partial enlarged views of a rotor assembly taken from a portion B in FIG. 1 according to exemplary embodiments of the present disclosure.
Figure 4B:
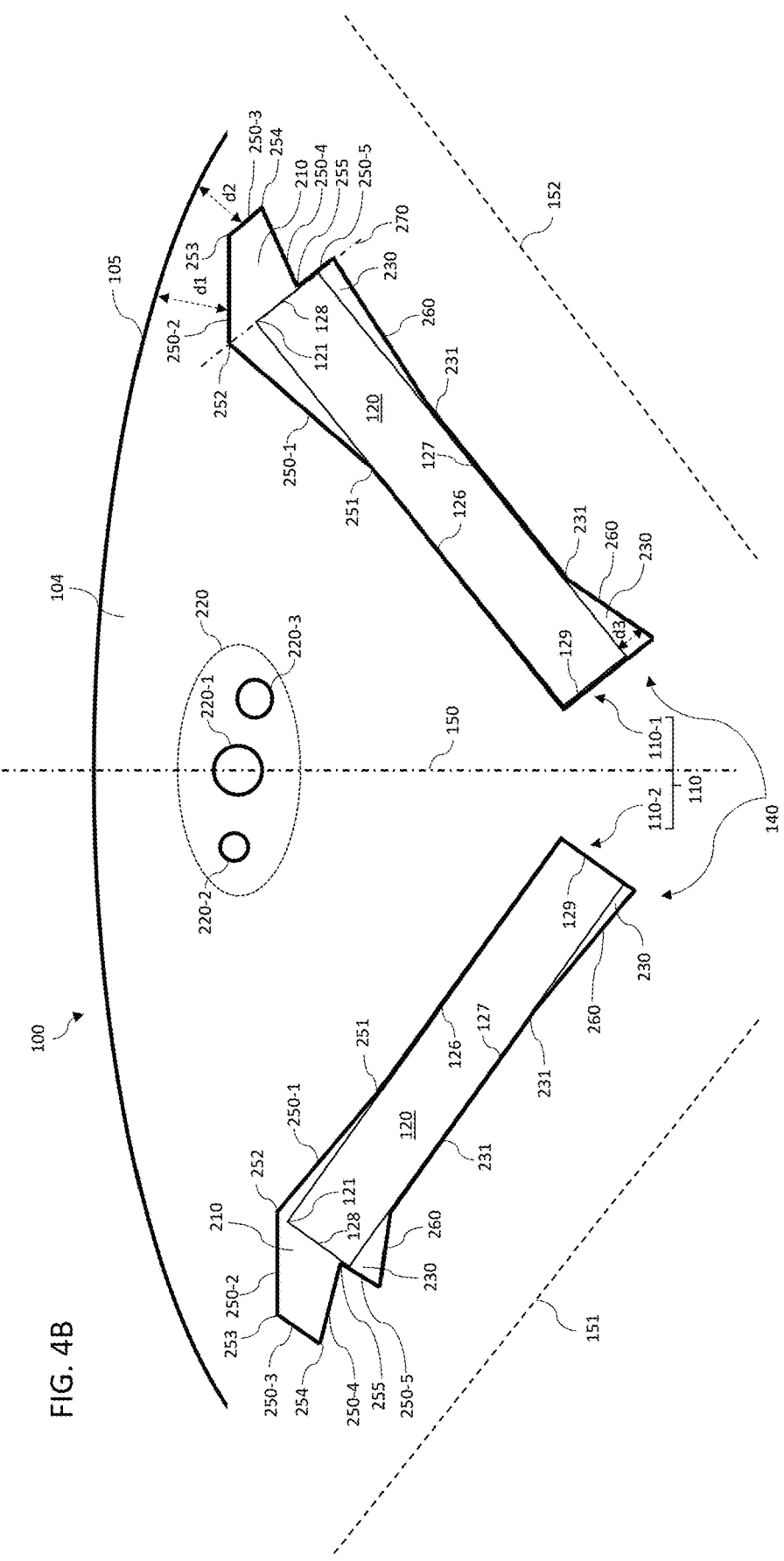

In an exemplary embodiment shown in FIG. 1, one pole 140 may comprise a pair of two adjacent magnet retention slots 110 forming V-shape, where one permanent magnet 120 is inserted into each magnet retention slot 110. The magnets 120 of the V shaped magnet retention slots 110 have same or similar magnetic poles that cooperate to form a magnetic pole 140 of the rotor assembly 100. Other constructions could employ two or more magnets 120 within each magnet retention slot 110. Instead of separate two magnet retention slots 110, the pair of two magnet retention slots 110 may be connected such that one bent slot (e.g. a V-shaped single slot) can form the pair of two magnet retention slots 110. Adjacent pair of two magnet retention slots 110 may be formed and disposed symmetrically as shown in FIG. 4A. Alternatively, one of the pair of two magnet retention slots 110 may be positioned, shaped, and sized asymmetrically to the other of the pair of two magnet retention slots 110 as shown in FIG. 4B. The pair of the magnet retention slots 110 cooperate with the outer surface 105 of the rotor core 104.

A pole location may be generally defined by a center-pole axis (e.g. d-axis) that extends radially from the central axis 102 toward the outer surface 105 of the rotor assembly 100 along a midpoint between adjacent magnet pockets 110. The interpolar axes 151, 152 (e.g. q-axis) may extend radially from the central axis 102 toward the outer surface 105 of the rotor assembly 100 between adjacent poles. The q-axis is shown as 22.5 mechanical degrees from the d-axis, and the q-axis is separated by 90 electrical degrees. Each pole 140 may have an associated surface area on the outer circumferential surface 105 of the rotor assembly 100. Each pole 140 may be represented by the arc length on the surface between adjacent inter-polar axes 151, 152.

Each of the magnet retention slots 110 may have a plurality of angled or curved slot surfaces 250 (including 250-1, 250-2, 250-3, 250-4, 250-5) around a first corner 121 of the magnet 120. For example, the first to fifth angled or curved slot surfaces 250-1 to 250-5 may be at least one of an angled flat surface, a curved surface, or combination thereof. The first corner 121 of the magnet 120 may be a corner of the magnet 120 positioned closest to the outer surface 105 of the rotor core 104 among four corners of the magnet 120. The plurality of angled or curved slot surfaces 250 may be located around a corner rib of the rotor core 104. The plurality of angled or curved slot surfaces 250 around the first magnet corner 121 may form a first barrier 210. The first barrier 210 may be an air gap. Non-magnetic material (e.g. nylon, epoxy, potting material or other filler material) could be positioned or injected into the first barrier 210 to inhibit unwanted movement of the magnet 120. The first barrier 210 of the magnet retention slot 110 may define magnetic flux passages and thereby operate to guide the magnetic flux in a desired direction. The first barrier 210 of the magnet retention slot 110 may be shaped, sized, or positioned around the corner rib of the rotor core 104 such that the stress to the rotor assembly 100 can be lowered and the torque ripple can be decreased.

The plurality of angled or curved slot surfaces 250 of each magnet retention slot 110 may comprise a first angled or curved slot surface 250-1 slanted relative to an outer surface of the magnet 120. For example, the first angled or curved slot surface 250-1 of the first barrier 210 is relatively gently slanted away from a first side surface 126 of the magnet 120 which faces the outer surface 105 of the rotor core 104. The first angled or curved slot surface 250-1 forms a barrier along a part or entire of the first side surface 126 of the magnet 120. The first angled or curved slot surface 250-1 slanted relative to the first side surface 126 of the magnet 120 may reduce the stress to the rotor assembly 100 at the high speed operation of the motor 10.

A second angled or curved slot surface 250-2 of the first barrier 210 may extend from an end 252 of the first angled or curved slot surface 250-1, to which is an opposite end 251 of the first angled or curved slot surface 250-1 which may contact the first side surface 126 of the magnet 120. For example, the end 252 of the first angled or curved slot surface 250-1 connected with the second angled or curved slot surface 250-2 may be positioned on the substantially same plane 270 as a first end surface 128 of the magnet 120 which is located closer to the outer surface 105 of the rotor core 140 than a second end surface 129 of the magnet 120, although it is not required. The second angled or curved slot surface 250-2 of the first barrier 210 may gradually decrease a distance $d_1$ between the outer surface 105 of the rotor core 140 and the second angled or curved slot surface 250-2 of the first barrier 210 in a direction away from the end 252 of the first angled or curved slot surface 250-1.

A third angled or curved slot surface 250-3 of the first barrier 210 extending from an end 253 of the second angled or curved slot surface 250-2 may gradually increase a distance $d_2$ between the outer surface 105 of the rotor core 140 and the third angled or curved slot surface 250-3 of the first barrier 210 in a direction away from the end 253 of the second angled or curved slot surface 250-2.

A fourth angled or curved slot surface 250-4 of the first barrier 210 extending from an end 254 of the third angled or curved slot surface 250-3 may extend toward the first end surface 128 of the magnet 120. One end 255 of the fourth angled or curved slot surface 250-4, opposite to the other end 254 of the fourth angled or curved slot surface 250-4, and/or at least a portion of a fifth angled or curved slot surface 250-5 may contact the first end surface 128 of the magnet 120 so that the magnet retention slot 110 can hold the magnet 120 or provide force for retaining the magnet 120 in the magnet retention slot 110.

The above-described shapes, sizes and positions of the first barrier 210 formed by the first to fourth angled or curved slot surfaces 250-1 to 250-4 may achieve reduction in possible stress to the rotor assembly 100 as well as lower torque ripple of the motor 10.

As shown in an exemplary embodiment of FIG. 4B, the shape, size and/or position of the first barrier 210 of one 110-1 of two adjacent magnet retention slots 110 forming one pole 140 may be asymmetrical to the shape, size and/or position of the first barrier 210 of the other 110-2 of two adjacent magnet retention slots 110 in order to reduce the torque ripple or cogging toque of the motor 10. Alternatively, as illustrated in an exemplary embodiment of FIG. 4A, the first barriers 210 of two adjacent magnet retention slots 110-1 and 110-2 forming one pole 140 may have symmetrical shapes, sizes and/or positions to each other.

Three or more second barriers 220 may be positioned around a mid-axis 150 extending along between the pair of the adjacent magnet retention slots 110-1 and 110-2. For example, the mid-axis 150 may be a direct current axis (d-axis) of the pole 140 or a center-pole axis that extends radially from the central axis 102 toward the outer surface 105 of the rotor assembly 100 along a midpoint between adjacent magnet retention slots 110-1 and 110-2. The d-axis is an axis of the field winding the direction of the direction-current field. The mid-axis 150 bisects two of the adjacent magnet retention slots 110-1 and 110-2 that are spaced apart from each other. The mid-axis 150 may be separated by ninety (90) electrical degrees. Alternatively, the second barriers 220 may be arranged between the pair of the adjacent magnet retention slots 110-1 and 110-2 regardless of the angle or location of the mid-axis 150. The second barriers 220 may define magnetic flux passages and thereby operate to guide the magnetic flux in a desired direction. The second barriers 220 may extend through the entire or part of the multiple rotor laminations 103 forming the rotor core 104. The second barrier 220 may be an air hole. Non-magnetic material (e.g. nylon, epoxy, potting material or other filler material) could be positioned or injected into the second barrier 220.

In the exemplary embodiments illustrated in FIGS. 4A and 4B, each pole 140 may have three second barriers 220. A middle barrier 220-1 among the second barriers 220 positioned in the middle of the second barriers 220 may be larger than other second barriers 220 such as two outer barriers 220-2, 220-3. Alternatively, the middle barrier 220-1 may be smaller than, or the same as, at least one or all of the outer barriers 220-2, 220-3. The middle barrier 220-1 may be positioned on the mid-axis 150, although it is not required. By placing the middle barrier 220-1 on the mid-axis 150 (e.g. the center of the d-axis), the torque ripple performance may be improved. The second barriers 220 may be optimized to achieve better performance of the motor 10 such as reduction in torque ripple and increase in the output torque or speed of the motor 10.

The outer barriers 220-2, 220-3 may be asymmetric in size, shape and/or position. One of the outer barriers 220-2, 220-3 may be larger or smaller than another outer barrier. The positions of the outer barriers 220-2 and 220-3 are asymmetrically arranged to each other with respect to the mid-axis 150 or the middle barrier 220-1. Each of the outer barriers 220-2, 220-3 may be disposed at different distances from the mid-axis 150 or the middle barrier 220-1. For example, one of the outer barriers 220-2, 220-3 may be positioned closer to the mid-axis 150 or the middle barrier 220-1 than the other of the outer barriers 220-2, 220-3. And, each of the outer barriers 220-2, 220-3 may be disposed at different distances from the outer surface 105 of the rotor core 104. At least one or all second barriers 220 may have different shapes from one another. The second barrier 220 may be formed as a circular hole, but the second barriers 220 may be shaped as an oval, a triangle, a square, a polygon, or other shape suitable for use. The asymmetrical arrangement and/or configuration of the second barriers 220 in size, position and/or shape may improve ripple and cogging performance. For example, unintended ripple in torque and/or cogging torque may be reduced. Alternatively, the second barriers 200 may have the same shape as each other and/or the outer second barriers 220-2, 220-3 may be symmetric to each other. Differently shaped or arranged second barriers 220, as well as different quantities could be employed if desired. In other words, the second barriers 220 can have any configuration and/or location that can optimize to achieve better performance of the electric motor 10, for example, but not limited to, reduction in torque ripple and increase in torque output of the motor 10.

The above-described positions, sizes, shapes, arrangements and configurations of the second barriers 220 may reduce the ripple torque or cogging torque. However, the third barriers 230 may have any position, size, shape, arrangement and configuration that can improve performance of the motor 10.

The magnet retention slot 110 may include one or more slanted or curved surfaces 260 in order to form one or more third barriers 230. For example, the slanted or curved surfaces 260 of the magnet retention slot 110 may be at least one of an angled flat surface, a curved surface, or combination thereof. The slanted or curved surface 260 of the third barrier 230 may be slanted or curved relative to a second side surface 127 of the magnet 120 facing an inner surface 106 of the rotor core 104. The third barrier 260 may be formed by one or more slanted or curved surfaces 260 of the magnet retention slot 110 and the second side surface 127 of the magnet 120. One or more third barriers 260 may be disposed around one or both ends of the second side surface 127 of the magnet 120. For example, at least one of the third barriers 230 of each of the magnet retention slots 110 may be formed close to the mid-rib of the rotor core 104. The distance $d_3$ between the slanted or curved surface 260 of the magnet retention slot 110 and the second side surface 127 of the magnet 120 may gradually increase from a point 231, where the slanted or curved surface 260 of the magnet retention slot 110 and the second side surface 127 of the magnet 120 contact or are disposed closest to each other, toward the end surface 128, 129 of the magnet 120 or an end of the second side surface 127 of the magnet 120. The third barriers 230 of the magnet retention slots 110 may have a triangular shape, but the third barriers 230 may be shaped as partial circle or oval, a square, a polygon, or other shape suitable for improving the performance of the motor 10.

As shown in the exemplary embodiment of FIG. 4B, the shape of the third barriers 230 of one 110-1 of two adjacent magnet retention slots 110 forming one pole 140 may be asymmetrical to the shape of the third barrier 230 of the other 110-2 of two adjacent magnet retention slots 110 in order to have lower torque ripple of the motor 10 and lower stress to the rotor assembly 100. Alternatively, as illustrated in the exemplary embodiment of FIG. 4A, the first barriers 230 of two adjacent magnet retention slots 110-1 and 110-2 forming one pole 140 may have symmetrical shapes to each other.

The above-described positions, sizes, shapes, arrangements and configurations of the third barriers 230 may improve the stress performance for high speed applications as well as the ripple operation. In other words, the third barriers 230 may reduce stresses on the rotor assembly 100 at high speeds and decrease the torque ripple of the motor 10. However, the third barriers 230 may have any position, size, shape, arrangement and configuration that can improve performance of the motor 10, for example, but not limited to, lowering the stresses on the rotor assembly 100 under high speed operation and reducing the torque ripple or cogging torque of the motor 10.

Figure 5:
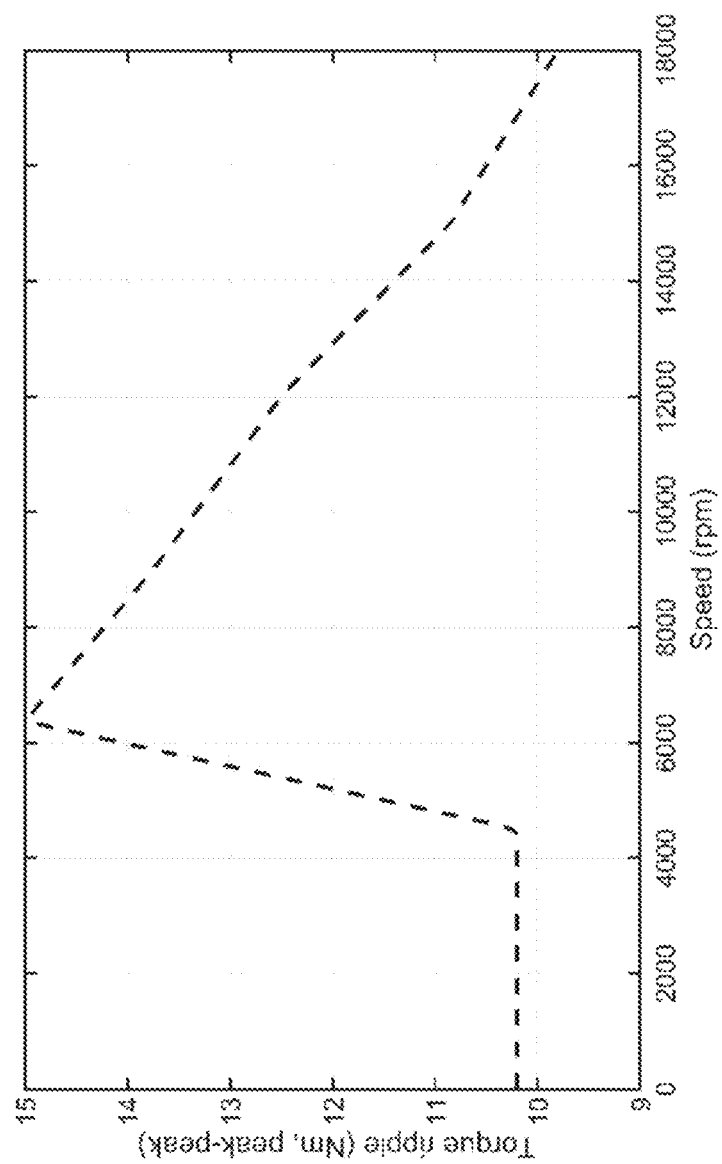
FIG. 5 is a graph showing a ripple performance of a permanent magnet motor according to an exemplary embodiment of the present disclosure.

According to some embodiments of the present disclosure, the first, second and third barriers 210, 220 and 230 of the rotor core 104 may improve the ripple operation of the motor 10. FIG. 5 is a graph illustrating a ripple performance of the motor 10 according to an exemplary embodiment of the present disclosure. FIG. 5 shows that the peak-peak ripple close to the base speed is less than 3.6%. Therefore, the first, second and third barriers 210, 220 and 230 of the rotor core 104 may result in a decrease in torque ripple.

Figure 6B:
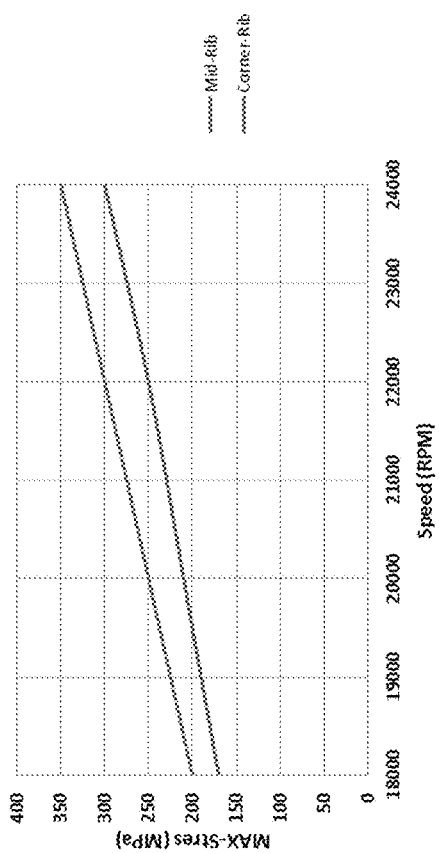
FIGS. 6A and 6B are graphs showing a stress performance of a permanent magnet motor according to an exemplary embodiment of the present disclosure.
Figure 6A:
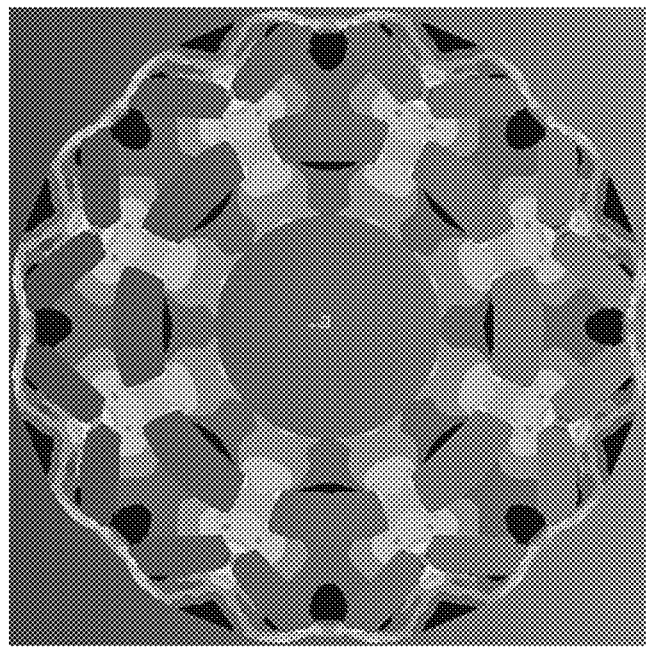

Further, according to certain embodiments of the present disclosure, the first and third barriers 210 and 230 of the rotor core 104 may cause to achieve better stress performance of the motor 10. FIGS. 6A and 6B are graphs illustrating the stress performance of the motor 10 according to an exemplary embodiment of the present disclosure. FIG. 6B shows that the stress on the rotor assembly 100 is less than 350 MPa even at the maximum mechanical speed 24,000 rpm. Accordingly, the shapes of the first and third barriers 210 and 230 of the rotor core 104 may reduce the stress to the rotor assembly 100.

Figure 7A:
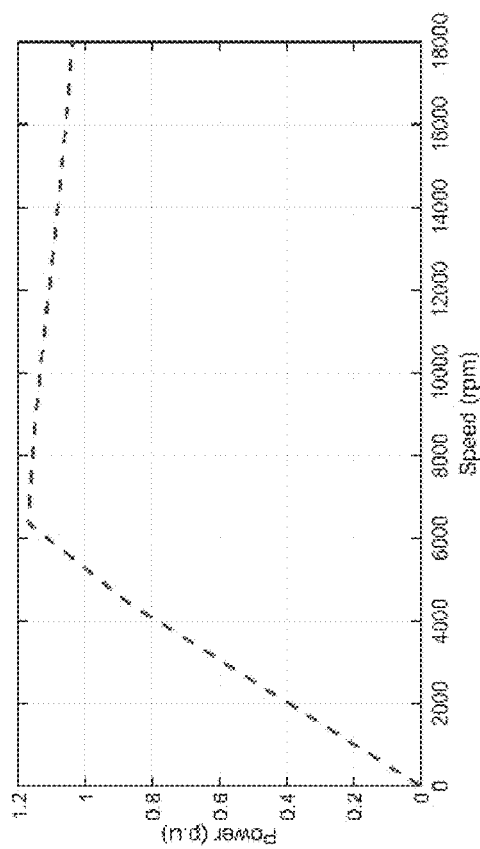
FIGS. 7A and 7B are graphs showing output torque and power of a permanent magnet motor according to an exemplary embodiment of the present disclosure.
Figure 7B:
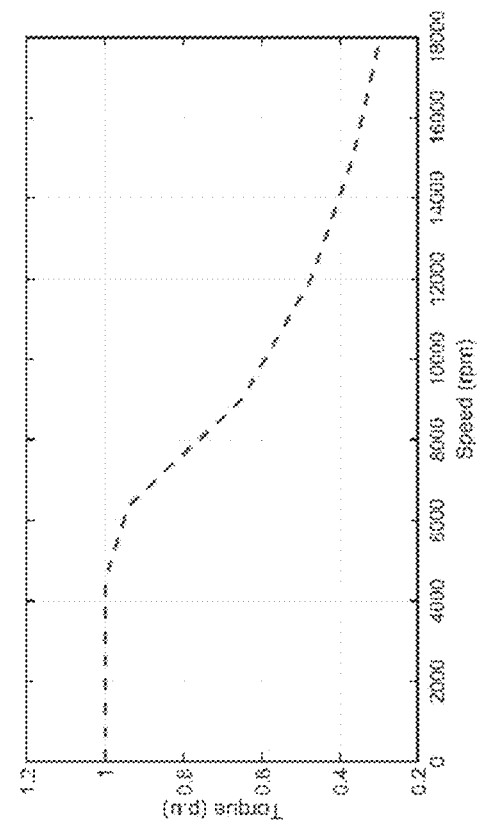

Additionally, various embodiments of the present disclosure may provide higher output torque and power of the motor 10 as shown in FIGS. 7A and 7B. Thus, the embodiments of the present disclosure may decrease the torque ripple and the stress without decreasing the torque and power output of the motor 10.

Although the example embodiments have been described in detail, it should be understood that various changes, substitutions and alterations can be made herein without departing from the spirit and scope of the application as defined by the appended claims.

Moreover, the scope of the present application is not intended to be limited to the particular embodiments of the process, machine, manufacture, and composition of matter, means, methods and steps described in the specification. As one of ordinary skill in the art will readily appreciate from the disclosure, processes, machines, manufacture, compositions of matter, means, methods or steps, presently existing or later to be developed, that perform substantially the same function or achieve substantially the same result as the corresponding embodiments described herein may be utilized according to the embodiments and alternative embodiments. Accordingly, the appended claims are intended to include within their scope such processes, machines, manufacture, compositions of matter, means, methods, or steps.

What is claimed is:

1. A permanent magnet motor comprising:
a stator assembly comprising teeth associated with arrangement of conductors; and
a rotor assembly configured to be rotatable relative to the stator assembly, the rotor assembly having a plurality of poles,
wherein each pole of the rotor assembly comprises:
a pair of magnet retention slots, each magnet retention slot accommodating a magnet, wherein the each magnet retention slot has a plurality of angled or curved slot surfaces forming a first barrier around a corner of the magnet positioned closest to an outer surface of the rotor assembly;
at least three second barriers positioned around a mid-axis extending along between the pair of the magnet retention slots; and
the first barrier has a first angled or curved slot surface slanted toward the at least three second barriers from a first side surface of the magnet facing the at least three second barriers to form a first part of the first barrier between the magnet and the at least three second barriers,
wherein the at least three second barriers positioned around the mid-axis extending along between the pair of the magnet retention slots comprise:
outer barriers; and
a middle barrier positioned between the outer barriers,
wherein one of the outer barriers is positioned above the middle barrier and another of the outer barriers is positioned below the middle barrier with respect to a radial direction.

2. The permanent magnet motor of claim 1, wherein surfaces of the teeth of the stator assembly facing the rotor assembly are flat.

3. The permanent magnet motor of claim 1, wherein the plurality of angled or curved slot surfaces forming the first barrier around the corner of the magnet positioned closest to the outer surface of the rotor assembly comprise: the first angled or curved slot surface slanted relative to the first side surface of the magnet facing the outer surface of the rotor assembly; and a second angled or curved slot surface extending from the first angled or curved slot surface gradually decreasing a distance between the outer surface of the rotor assembly and the second angled or curved slot surface.

4. The permanent magnet motor of claim 3, wherein the plurality of angled or curved slot surfaces forming the first barrier around the corner of the magnet positioned closest to the outer surface of the rotor assembly further comprise: a third angled or curved slot surface extending from the second angled or curved slot surface and gradually increasing a distance between the outer surface of the rotor assembly and the third angled or curved slot surface.

5. The permanent magnet motor of claim 4, wherein the plurality of angled or curved slot surfaces forming the first barrier around the corner of the magnet positioned closest to the outer surface of the rotor assembly further comprise: a fourth angled or curved slot surface extending from the third angled or curved slot surface toward one end of the magnet.

6. The permanent magnet motor of claim 1, wherein the first barrier of one of the pair of the magnet retention slots formed around the corner of the magnet positioned closest to the outer surface of the rotor assembly is asymmetric to the first barrier of another of the pair of the magnet retention slots formed around the corner of the magnet positioned closest to the outer surface of the rotor assembly with respect to the mid-axis.

7. The permanent magnet motor of claim 1, wherein the each magnet retention slot comprises one or more slot surfaces slanted or curved relative to a second side surface of the magnet facing an inner surface of the rotor assembly to form one or more third barriers around one or both ends of the second side surface of the magnet.

8. The permanent magnet motor of claim 7, wherein the one or more third barriers formed around the one or both ends of the second side surface of the magnet facing the inner surface of the rotor assembly have a triangular shape.

9. The permanent magnet motor of claim 7, wherein the one or more third barriers of one of the pair of the magnet retention slots formed around the one or both ends of the second side surface of the magnet is asymmetric to the one or more third barriers of another of the pair of the magnet retention slots formed around the one or both ends of the second side surface of the magnet with respect to the mid-axis.

10. The permanent magnet motor of claim 7, wherein the one or more third barriers formed around the one or both ends of the second side surface of the magnet facing the inner surface of the rotor assembly are configured to reduce torque ripple of the permanent magnet motor and stress to the rotor assembly.

11. The permanent magnet motor of claim 1, wherein the pair of magnet retention slots have shapes, sizes and/or positions asymmetric to each other with respect to the mid-axis.

12. The permanent magnet motor of claim 1, wherein the at least three second barriers positioned around the mid-axis extending along between the pair of the magnet retention slots comprise:
outer barriers; and
a middle barrier positioned between the outer barriers, wherein the middle barrier is larger than the outer barriers.

13. The permanent magnet motor of claim 1, wherein the at least three second barriers positioned around the mid-axis extending along between the pair of the magnet retention slots comprise:
outer barriers; and
a middle barrier positioned between the outer barriers, wherein the outer barriers are positioned asymmetrically with respect to the middle barrier or the mid-axis extending along between the pair of the magnet retention slots.

14. The permanent magnet motor of claim 1, wherein the at least three second barriers positioned around the mid-axis extending along between the pair of the magnet retention slots comprise:
outer barriers; and
a middle barrier positioned between the outer barriers, wherein the outer second barriers have different sizes and/or shapes from each other.

15. The permanent magnet motor of claim 1, wherein the at least three second barriers positioned around the mid-axis extending along between the pair of the magnet retention slots comprise:
outer barriers; and
a middle barrier positioned between the outer barriers and at the mid-axis extending along between the pair of the magnet retention slots.

16. The permanent magnet motor of claim 1, wherein the plurality of angled or curved slot surfaces forming the first barrier around the corner of the magnet positioned closest to the outer surface of the rotor assembly are configured to reduce torque ripple of the permanent magnet motor and stress to the rotor assembly.

17. The permanent magnet motor of claim 1, wherein the at least three second barriers positioned around the mid-axis extending along between the pair of the magnet retention slots are configured to reduce torque ripple of the permanent magnet motor.

18. The permanent magnet motor of claim 1, wherein the first barrier further has a second angled or curved slot surface slanted from a second side surface of the magnet, which is positioned opposite to the first side surface of the magnet facing the at least three second barriers, to form a second part of the first barrier between the second angled or curved slot surface and the second side surface of the magnet positioned opposite to the first side surface of the magnet facing the at least three second barriers.

19. The permanent magnet motor of claim 18, wherein the first barrier further has a third angled or curved slot surface slanted relative to a third side surface of the magnet, positioned between ends of the first and second side surfaces of the magnet, to form a third part of the first barrier between the third angled or curved slot surface and the third side surface of the magnet positioned between the ends of the first and second side surfaces of the magnet.

* * * * *